US011192572B2

(12) United States Patent
Nishimine et al.

(10) Patent No.: US 11,192,572 B2
(45) Date of Patent: Dec. 7, 2021

(54) STEERING SYSTEM

(71) Applicant: JTEKT CORPORATION, Osaka (JP)

(72) Inventors: Yusuke Nishimine, Sakurai (JP); Masayoshi Sakuda, Kashihara (JP); Atsumune Nagatani, Lyons (FR); Daiki Goto, Hamamatsu (JP); Naohiro Oosono, Nara (JP); Yu Myohoji, Habikino (JP)

(73) Assignee: JTEKT CORPORATION, Osaka (JP)

( * ) Notice: Subject to any disclaimer, the term of this patent is extended or adjusted under 35 U.S.C. 154(b) by 99 days.

(21) Appl. No.: 16/394,656

(22) Filed: Apr. 25, 2019

(65) Prior Publication Data

US 2019/0344821 A1 Nov. 14, 2019

(30) Foreign Application Priority Data

May 8, 2018 (JP) .............................. JP2018-090079

(51) Int. Cl.
| | |
|---|---|
| *B62D 1/19* | (2006.01) |
| *B62D 1/18* | (2006.01) |
| *B62D 1/185* | (2006.01) |
| *B62D 1/187* | (2006.01) |

(52) U.S. Cl.
CPC ............ *B62D 1/192* (2013.01); *B62D 1/185* (2013.01); *B62D 1/187* (2013.01)

(58) Field of Classification Search
CPC ........ B62D 1/184; B62D 1/185; B62D 1/187; B62D 1/192
See application file for complete search history.

(56) References Cited

U.S. PATENT DOCUMENTS

| | | | | |
|---|---|---|---|---|
| 5,845,936 | A | * | 12/1998 | Higashino ............... B62D 1/192 |
| | | | | 280/775 |
| 10,053,135 | B2 | * | 8/2018 | Sakuda ................... B62D 1/184 |
| 2005/0050978 | A1 | * | 3/2005 | Lee ......................... B62D 1/184 |
| | | | | 74/493 |
| 2006/0028010 | A1 | | 2/2006 | Yamada |
| 2013/0160592 | A1 | * | 6/2013 | Shibazaki ............... B62D 1/184 |
| | | | | 74/492 |
| 2015/0122075 | A1 | | 5/2015 | Mihara et al. |

(Continued)

FOREIGN PATENT DOCUMENTS

| | | |
|---|---|---|
| EP | 3 048 030 A1 | 7/2016 |
| JP | 2015-164851 A | 9/2015 |

OTHER PUBLICATIONS

Oct. 1, 2019 Extended Search Report issued in European Patent Application No. 19172807.0.

*Primary Examiner* — Barry Gooden, Jr.
(74) *Attorney, Agent, or Firm* — Oliff PLC

(57) ABSTRACT

A column jacket includes a hollow outer jacket having a pair of clamped portions disposed to sandwich a slit between the clamped portions and a tubular inner jacket having, in an area where the inner jacket is fitted in the outer jacket, an elongated hole extending in an axial direction. A clamping mechanism clamps the pair of clamped portions with a pair of side plates of a fixed bracket. The elongated hole is disposed on any one of a first side and a second side, in the lateral direction, of a vertical plane passing through a central axis of the inner jacket, at a position other than on a straight line that extends in a vertical direction through the central axis.

7 Claims, 9 Drawing Sheets

(56) References Cited

U.S. PATENT DOCUMENTS

| | | | |
|---|---|---|---|
| 2015/0266496 A1* | 9/2015 | Yoshihara | B62D 1/195 74/493 |
| 2015/0266499 A1* | 9/2015 | Yoshihara | B62D 1/189 74/493 |
| 2016/0144886 A1* | 5/2016 | Tomiyama | B62D 1/184 74/493 |
| 2016/0167693 A1* | 6/2016 | Sakuda | B62D 1/195 74/493 |
| 2016/0214638 A1* | 7/2016 | Okano | B62D 1/185 |
| 2017/0291632 A1* | 10/2017 | Sakuda | B62D 1/195 |
| 2017/0313344 A1 | 11/2017 | Yoshimura | |
| 2018/0001921 A1* | 1/2018 | Sakuda | B62D 1/184 |
| 2018/0229758 A1* | 8/2018 | Sakuda | B62D 1/184 |
| 2018/0237052 A1* | 8/2018 | Kurokawa | B62D 1/187 |
| 2018/0297624 A1* | 10/2018 | Zhang | B62D 1/189 |
| 2018/0304914 A1* | 10/2018 | Bodtker | B62D 1/184 |
| 2018/0362069 A1* | 12/2018 | Sugiura | B62D 1/189 |
| 2019/0077439 A1* | 3/2019 | Huber | B21D 51/02 |
| 2019/0111962 A1* | 4/2019 | Kurokawa | B62D 1/184 |
| 2019/0283792 A1* | 9/2019 | Suzuki | B62D 1/184 |
| 2020/0198686 A1* | 6/2020 | Abe | B62D 1/197 |
| 2020/0207400 A1* | 7/2020 | Sakuda | F16G 11/044 |

\* cited by examiner

STEERING SYSTEM

INCORPORATION BY REFERENCE

The disclosure of Japanese Patent Application No. 2018-090079 filed on May 8, 2018 including the specification, drawings and abstract, is incorporated herein by reference in its entirety.

BACKGROUND OF THE INVENTION

1. Field of the Invention

The invention relates to a steering system.

2. Description of Related Art

In a steering column apparatus proposed in Japanese Patent Application Publication No. 2015-164851 (JP 2015-164851 A) having an outer column (outer jacket) and an inner column (inner jacket) fitted and held in the outer column, the outer column has a single slit in a lower surface of a portion where the inner column is fitted and includes a pair of clamped portions that sandwich the slit from both sides in a width direction. According to JP 2015-164851 A, the outer column is configured such that an area where the slit is provided in one half in the width direction (hereinafter, referred to as the first widthwise half) of the portion where the slit is provided is larger than an area where the slit is provided in the other half in the width direction (hereinafter, referred to as the second widthwise half). This makes the first widthwise half of the outer column susceptible to deformation and increases holding power of the outer column for holding the inner column.

The outer column has a through locking hole for a steering lock device in an off-slit portion that is distant from the slit and axially distant from the portion where the inner column is fitted and held, and that has a high rigidity. The outer column is configured to be rigid at a portion surrounding the through locking hole so as not to deform even when an excessive force is imparted from a steering wheel. Hence, the through locking hole affects little on rigidity in a right-and-left direction (hereinafter, referred to as the lateral direction) of a steering column.

It may be practically difficult to solve simultaneously, using only the single slit provided in the portion of the outer column, where the inner column is fitted and held, both a task of adjusting the holding power for holding the inner column as desired and a task of adjusting, with regard to lateral rigidity of the steering column made up of the inner column and the outer column, a relationship between rigidity of a first lateral half and rigidity of a second lateral half as desired.

SUMMARY OF THE INVENTION

An object of the invention is to provide a steering system that adjusts, with regard to lateral rigidity of a column jacket, a relationship between rigidity of a first lateral half and rigidity of a second lateral half as desired while adjusting holding power for holding an inner jacket.

According to an aspect of the invention, a steering system includes a column jacket, a support member and a clamping mechanism. The column jacket includes a hollow outer jacket having a slit and a pair of clamped portions disposed to sandwich the slit between the clamped portions, and a tubular inner jacket fitted in the outer jacket to be slidable in an axial direction relative to the outer jacket. An elongated hole that extends in the axial direction and is a through hole or a blind hole is formed in an area of the inner jacket where the inner jacket is fitted in the outer jacket. The support member is fixed to a vehicle body and includes a pair of a first side plate and a second side plate that sandwiches the pair of clamped portions of the outer jacket in a lateral direction. The clamping mechanism holds a position of the inner jacket relative to the outer jacket by clamping the outer jacket against the inner jacket with the pair of side plates. The elongated hole is disposed on one of a first side and a second side, in the lateral direction, of a vertical plane passing through a central axis of the inner jacket, at a position other than on a straight line that extends in a vertical direction through the central axis.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
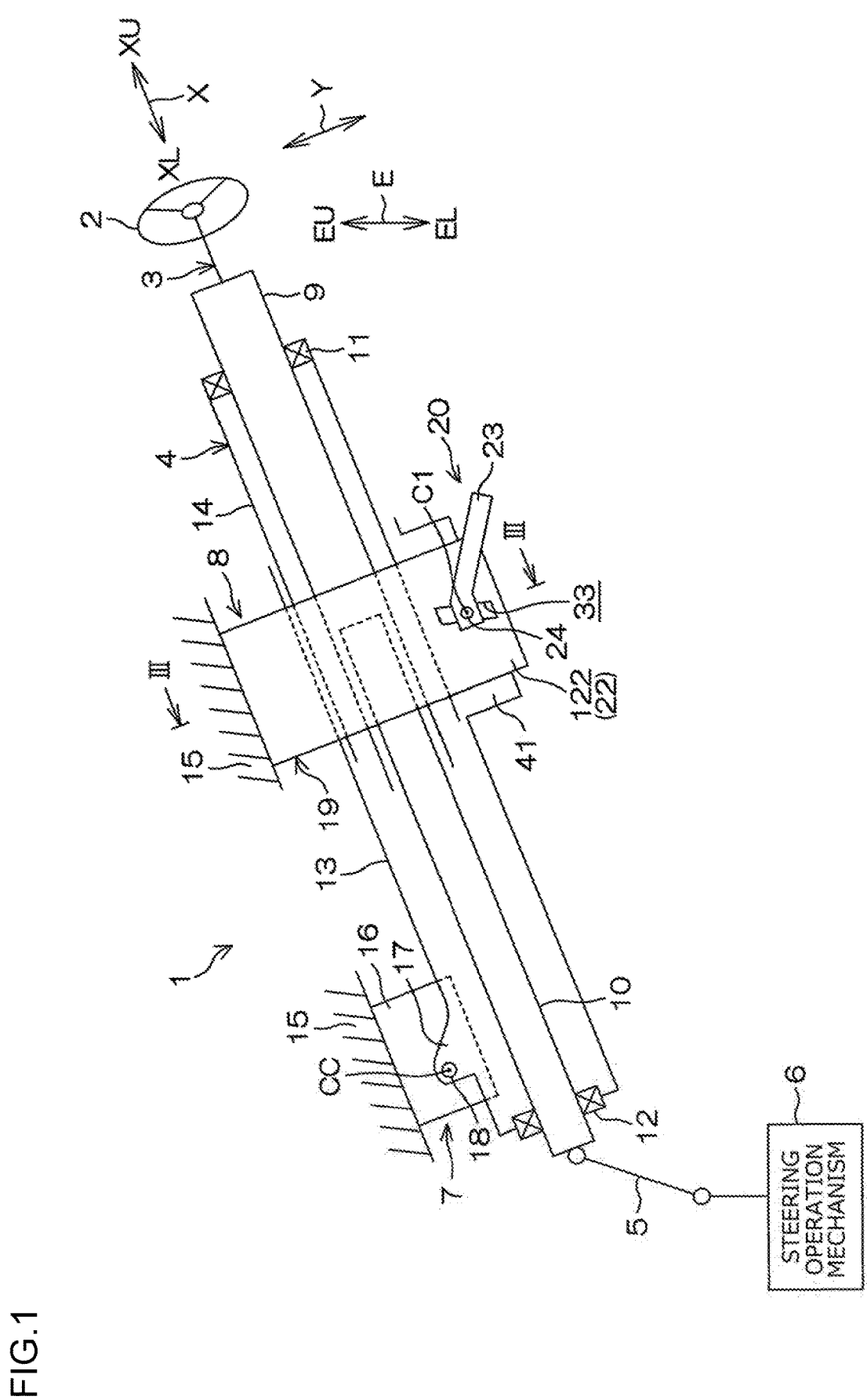
FIG. 1 is a partially-exploded schematic side view illustrating a steering system according to a first embodiment of the invention.

Embodiments of the invention are described below with reference to the accompanying drawings. FIG. 1 is a partially-exploded schematic side view illustrating a schematic configuration of a steering system 1 according to a first embodiment of the invention. Referring to FIG. 1, the steering system 1 includes a column shaft 3, a column jacket 4, an intermediate shaft 5, a steering operation mechanism 6, a lower support mechanism 7, and an upper support mechanism 8. The column shaft 3 is coupled to a steering member 2, which is a steering wheel, for example. The steering operation mechanism 6 is coupled to steered wheels (not illustrated).

The column shaft 3 is coupled to the steering operation mechanism 6 via the intermediate shaft 5. The steering system 1 turns the steered wheels via the steering operation mechanism 6 in conjunction with a steering operation of the steering member 2. The column shaft 3 includes an upper shaft 9 having an end, to which the steering member 2 is coupled, and a lower shaft 10 fitted in the upper shaft 9 to be slidable in an axial direction X relative to the upper shaft 9. The column shaft 3 is inserted through the column jacket 4. The column jacket 4 supports the column shaft 3 with a plurality of bearings 11 and 12 therebetween so that the column shaft 3 is rotatable.

The column jacket 4 includes a hollow outer jacket 13 that is on a lower side (hereinafter, sometimes referred to as the lower outer jacket 13) and a tubular inner jacket 14 that is on an upper side (hereinafter, sometimes referred to as the upper inner jacket 14). The outer jacket 13 is attached to a vehicle body 15. The inner jacket 14 is fitted in the outer jacket 13. The column jacket 4 is telescopic in the axial direction X such that the inner jacket 14 moves in the axial direction X relative to the outer jacket 13. The upper inner jacket 14 is coupled to the upper shaft 9 with the bearing 11 therebetween such that the inner jacket 14 is movable in the axial direction X integrally with the upper shaft 9. The lower outer jacket 13 supports the lower shaft 10 with the bearing 12 therebetween so that the lower shaft 10 is rotatable.

The lower outer jacket 13 is rotatably supported by the lower support mechanism 7. The lower support mechanism 7 includes a fixed bracket 16, a column bracket 17, and a tilt support shaft 18. The fixed bracket 16 is fixed to the vehicle body 15. The column bracket 17 is fixed to the outer jacket 13. The tilt support shaft 18 couples the fixed bracket 16 and the column bracket 17. A position of the steering member 2 is adjustable in an up-and-down direction (a tilt direction Y) by pivoting (tilting) the column shaft 3 and the column jacket 4 about a tilt center CC, which is a central axis of the tilt support shaft 18 (this is typically referred to as "tilt adjustment"). The position of the steering member 2 is adjustable in a fore-and-aft direction of a vehicle by extending and retracting the column shaft 3 and the column jacket 4 in the axial direction X (this is typically referred to as "telescopic adjustment").

Figure 2:
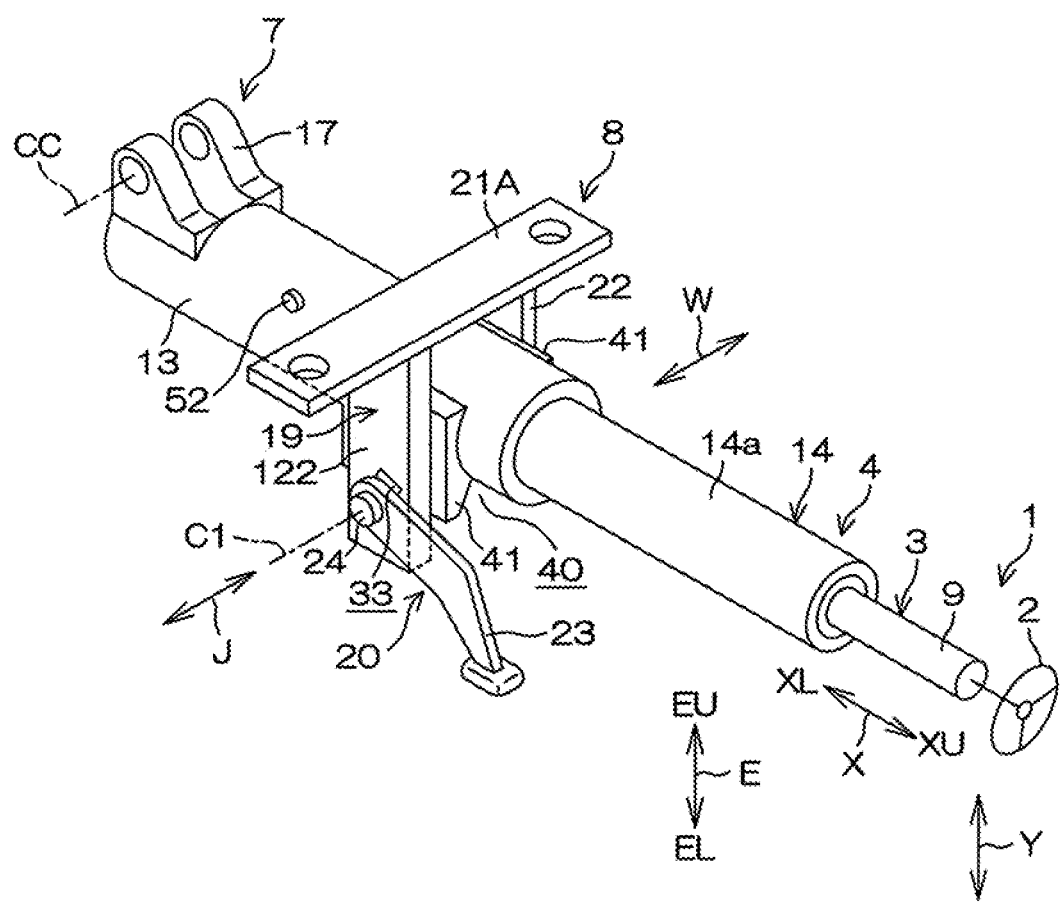
FIG. 2 is a schematic perspective view illustrating the steering system according to the first embodiment.
Figure 3:
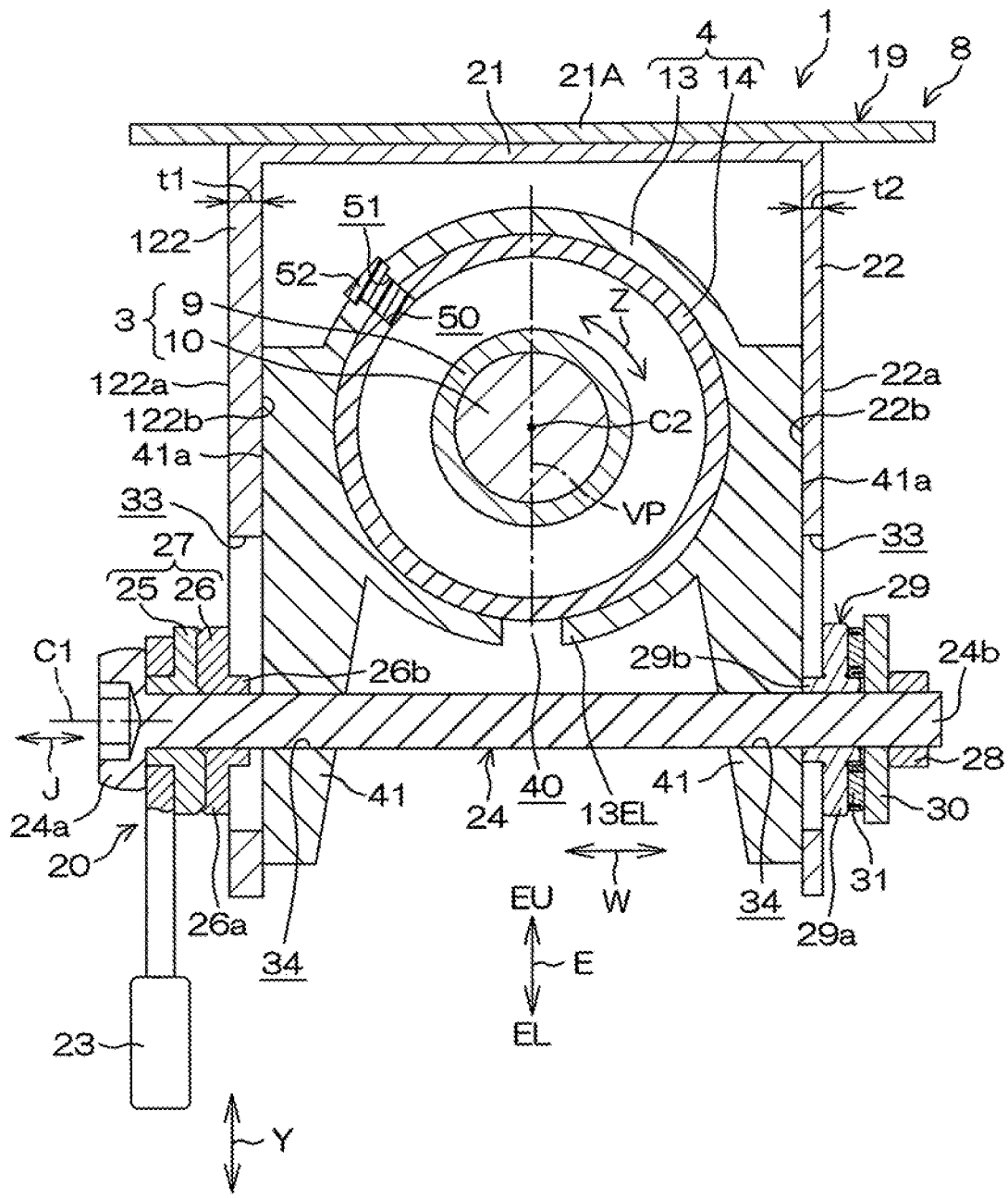
FIG. 3 is a schematic cross-sectional view illustrating the steering system according to the first embodiment, taken along a line III-III of FIG. 1.

FIG. 2 is a schematic perspective view of the steering system 1. FIG. 3 is a sectional view taken along a line III-III of FIG. 1. As illustrated in FIG. 1 to FIG. 3, the upper support mechanism 8 includes a fixed bracket 19, which is a support member fixed to the vehicle body 15, and a clamping mechanism 20. The fixed bracket 19 (support member) includes a mount plate 21A, a top plate 21, and a first side plate 122 and a second side plate 22, which form a pair of side plates 122 and 22. The mount plate 21A is attached to the vehicle body 15. The top plate 21 is fixed to the mount plate 21A. The pair of side plates 122 and 22 extend downward from respective lateral ends of the top plate 21. As illustrated in FIG. 3, a thickness t1 of the first side plate 122 is larger than a thickness t2 of the second side plate 22 (t1>t2). The first side plate 122, which is the thicker one of the side plates, may be disposed on either side in a right-and-left direction W (hereinafter, referred to as the lateral direction W) of a vertical plane VP.

The clamping mechanism 20 clamps, from opposite lateral sides, a pair of plate-like clamped portions 41 integrally provided on the outer jacket 13 with the pair of side plates 122 and 22 of the fixed bracket 19 interposed between the clamping mechanism 20 and the clamped portions 41. Tilt locking and telescope locking are thus achieved. The clamping mechanism 20 includes an operating lever 23, a clamping shaft 24, a force conversion mechanism 27, a nut 28, a second clamping member 29, a washer 30, and a needle roller bearing 31. The force conversion mechanism 27 includes a rotary cam 25 and a first clamping member 26, which is a non-rotary cam.

Figure 4:
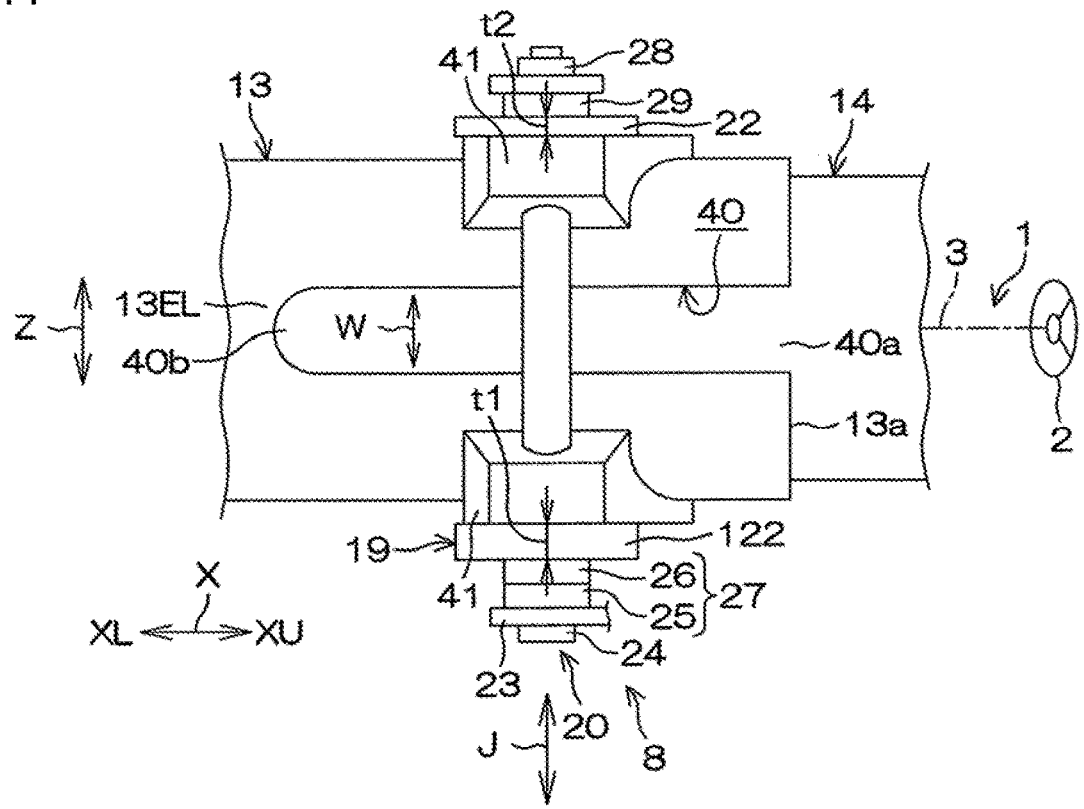
FIG. 4 is a bottom view illustrating main parts of the steering system according to the first embodiment.

The operating lever 23 serves as an operating member to be rotated by a driver. The clamping shaft 24 is rotatable integrally with the operating lever 23. A central axis C1 of the clamping shaft 24 corresponds to a center of rotation of the operating lever 23. As illustrated in FIG. 3 and FIG. 4, which is a schematic bottom view illustrating main parts of the steering system 1, a slit 40 extending in the axial direction X is provided in the outer jacket 13. The slit 40 allows elastic reduction in diameter of the outer jacket 13. The outer jacket 13 includes the pair of plate-like clamped portions 41 disposed at positions sandwiching the slit 40 therebetween.

As illustrated in FIG. 3, the slit 40 is located at a vertically lower end portion 13EL, which is a lower end portion in a vertical direction E, of the outer jacket 13. As illustrated in FIG. 4, the slit 40 extends from an open end 40a to a closed end 40b. The open end 40a is at a jacket end 13a on an upper side XU in the axial direction X of the outer jacket 13. The closed end 40b is at a predetermined position in the axial direction X of the outer jacket 13.

The pair of clamped portions 41 provided on the outer jacket 13 faces each other in the lateral direction W (which coincides with a clamping shaft direction J, which is an axial direction of the clamping shaft 24). The slit 40 extending in the axial direction X of the outer jacket 13 is located between the pair of clamped portions 41 in a circumferential direction Z of the outer jacket 13. The clamping mechanism 20 achieves tilt locking by clamping, via the clamping shaft 24, the fixed bracket 19 against the pair of clamped portions 41 of the outer jacket 13. The clamping mechanism 20 achieves telescope locking by clamping the pair of clamped portions 41 of the outer jacket 13 so that the inner jacket 14 is held immovably in the axial direction X by the outer jacket 13 that is reduced in diameter. Hence, the position of the steering member 2 is fixed relative to the vehicle body 15 (see FIG. 1).

The clamping shaft 24 is inserted through tilting elongated holes 33, each provided in a corresponding one of the pair of side plates 122 and 22 of the fixed bracket 19 and extending in the tilt direction Y. The pair of clamped portions 41 of the outer jacket 13 is disposed between inner side faces 122b and 22b of the pair of side plates 122 and 22 and each formed in a plate-like shape to conform to the inner side face 122b or 22b of a corresponding one of the side plates 122 and 22. Each of the inner side faces 122b and 22b of the side plates 122 and 22 faces an outer side face 41a of a corresponding one of the clamped portions 41.

A clamping-shaft through hole 34, which is a circular hole through which the clamping shaft 24 is inserted, is provided in each of the clamped portions 41 of the outer jacket 13. The clamping shaft 24, the outer jacket 13, the inner jacket 14, and the column shaft 3 move together in the tilt direction Y when tilt adjustment is performed. The clamping shaft 24 is a bolt inserted through the tilting elongated holes 33 in the pair of side plates 122 and 22 of the fixed bracket 19 and the clamping-shaft through holes 34 in the pair of clamped portions 41 of the outer jacket 13. A large-diameter head portion 24a provided at one end of the clamping shaft 24 is fixed to be rotatable integrally with the operating lever 23.

The force conversion mechanism 27 of the clamping mechanism 20 is interposed between the head portion 24a of the clamping shaft 24 and an outer side face 122a of the first side plate 122 and converts an operating torque of the operating lever 23 to an axial force (a clamping force for clamping the pair of side plates 122 and 22) of the clamping shaft 24. The rotary cam 25 of the force conversion mechanism 27 is coupled to the operating lever 23 so as to rotate integrally therewith. Movement of the rotary cam 25 in the clamping shaft direction J relative to the clamping shaft 24 is restricted. The first clamping member 26, which is the non-rotary cam of the force conversion mechanism 27, makes cam engagement with the rotary cam 25 and presses the outer side face 122a of the first side plate 122 for clamping.

The nut 28 of the clamping mechanism 20 is screw-fitted in a threaded portion 24b at the other end of the clamping shaft 24. The second clamping member 29, the washer 30, and the needle roller bearing 31 are interposed between the nut 28 and the second side plate 22 of the fixed bracket 19. The second clamping member 29 presses an outer side face 22a of the second side plate 22 for clamping. The washer 30 and the needle roller bearing 31 are interposed between the second clamping member 29 and the nut 28. The washer 30 is interposed between the nut 28 and the second clamping member 29. The needle roller bearing 31 is interposed between the washer 30 and the second clamping member 29.

The rotary cam 25, the first clamping member 26 (non-rotary cam), the second clamping member 29, the washer 30, and the needle roller bearing 31 are supported on an outer periphery of the clamping shaft 24. The first clamping member 26 (non-rotary cam) includes a clamping plate portion 26a and a boss portion 26b. The second clamping member 29 includes a clamping plate portion 29a and a boss portion 29b. Each of the clamping plate portions 26a and 29a presses the outer side face 122a or 22a of a corresponding one of the side plates 122 and 22 for clamping. Each of the boss portions 26b and 29b is fitted in a corresponding one of the tilting elongated holes 33. Rotation of each of the clamping members 26 and 29 is restricted by fit-in engagement between a corresponding one of the boss portions 26b and 29b and a corresponding one of the tilting elongated holes 33.

The first clamping member 26 and the second clamping member 29 are supported on the clamping shaft 24 to be movable in the clamping shaft direction J. As the operating lever 23 is rotated in a locking direction, the rotary cam 25 rotates relative to the first clamping member 26 (non-rotary cam). As a result, the first clamping member 26 (non-rotary cam) moves in the clamping shaft direction J. The outer side faces 122a and 22a of the pair of side plates 122 and 22 of the fixed bracket 19 are pressed and clamped by (the clamping plate portions 26a and 29a of) the clamping members 26 and 29.

Accordingly, each of the inner side faces 122b and 22b of the side plates 122 and 22 of the fixed bracket 19 presses the outer side face 41a of a corresponding one of the clamped portions 41 of the outer jacket 13 for clamping. As a result, movement of the outer jacket 13 in the tilt direction Y is restricted, and tilt locking is achieved. Because both the clamped portions 41 are pressed for clamping, the outer jacket 13 is elastically reduced in diameter to clamp the inner jacket 14. As a result, movement of the inner jacket 14 in the axial direction X is restricted, and telescope locking is achieved.

The thickness t2 of the second side plate 22 is smaller than the thickness t1 of the first side plate 122 (t1>t2). This makes the second side plate 22 susceptible to deformation when clamped by the clamping mechanism 20. Accordingly, the second side plate 22 and the clamped portion 41 adjacent to the second side plate 22 are susceptible to deformation as a whole. As a result, holding power of the outer jacket 13 for holding the inner jacket 14 can be increased.

Figure 5:
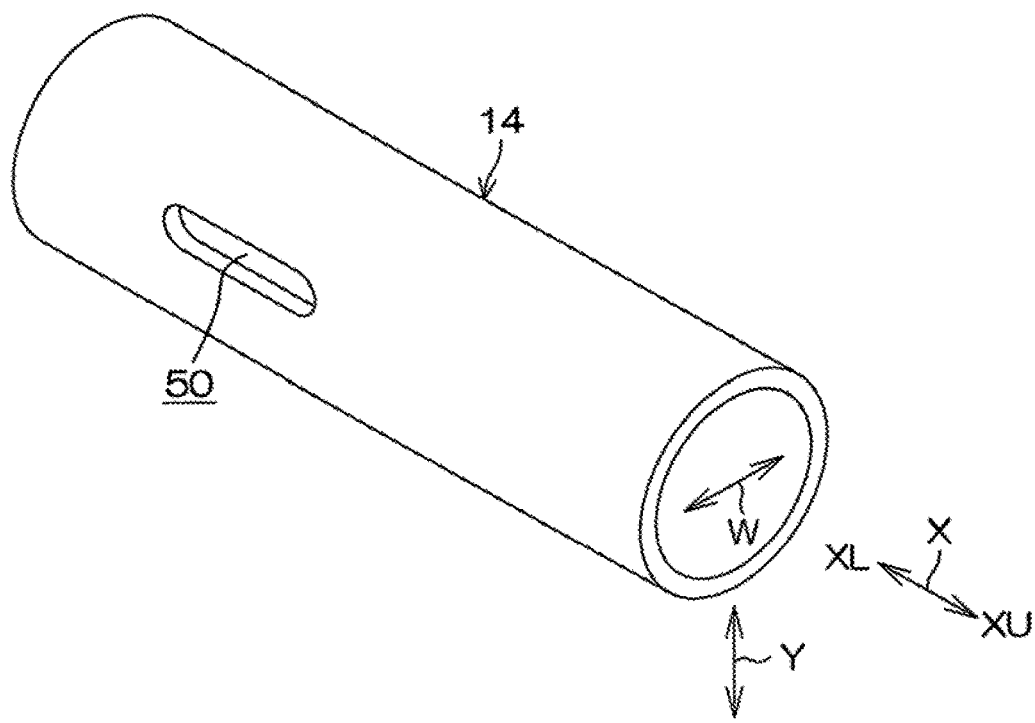
FIG. 5 is a schematic perspective view of an inner jacket on an upper side according to the first embodiment.

Susceptibility to deformation (susceptibility to diameter reduction) of the outer jacket 13 can be adjusted by adjusting, for example, a groove width of the slit 40 of the outer jacket 13. Hence, the holding power of the outer jacket 13 for holding the inner jacket 14 can be easily adjusted. FIG. 5 is a schematic perspective view illustrating the inner jacket 14. As illustrated in FIG. 5, the inner jacket 14 has an elongated hole 50 extending in the axial direction X. As illustrated in FIG. 3, the elongated hole 50 is disposed on a side close to the first side plate 122, which is the thicker one of the side plates, with respect to the vertical plane VP that passes through a central axis C2 of the inner jacket 14.

The elongated hole 50 is disposed at a position other than on a straight line that extends in the vertical direction E through the central axis C2. More specifically, when the inner jacket 14 is viewed in the axial direction X, the elongated hole 50 is disposed diagonally upward from the central axis C2. As illustrated in FIG. 2 and FIG. 3, a plastic pin 52 press-fitted in a fixation hole 51, which is a through hole provided in the outer jacket 13 and extending in a radial direction, is inserted in the elongated hole 50. Engagement between the elongated hole 50 and the plastic pin 52 restricts rotation of the inner jacket 14 in the circumferential direction Z relative to the outer jacket 13.

The inner jacket 14 is guided by the plastic pin 52 engaged in the elongated hole 50 to move in the axial direction X. An end portion on the upper side XU and an end portion on a lower side XL of the elongated hole 50 in the axial direction X individually abut against the plastic pin 52. A movable range of the inner jacket 14 in the axial direction X is thus limited. In other words, the plastic pin 52 has a function of limiting the movable range of the inner jacket 14 in telescopic adjustment. In case of secondary collision, the plastic pin 52 is broken by abutting against the end portion on the upper side XU in the axial direction X of the elongated hole 50 to generate an impact absorbing load.

In the first embodiment, susceptibility to diameter reduction of the outer jacket 13 is adjusted using the slit 40 between the pair of clamped portions 41 in the outer jacket 13. Hence, the holding power for holding the inner jacket 14 can be adjusted. The elongated hole 50 is provided in the inner jacket 14 in a fit-in area where the inner jacket 14 is fitted in the outer jacket 13, at a position on a first side, in the lateral direction W, of the vertical plane VP passing through the central axis C2. Accordingly, with regard to lateral rigidity of the column jacket 4, a relationship (e.g., a lateral difference) between rigidity of a first lateral half and rigidity of a second lateral half of the inner jacket 14 can be adjusted as desired by reducing rigidity of the lateral half where the elongated hole 50 is provided.

More specifically, the holding power is adjusted mainly by changing a specification (e.g., changing a slit width) of the slit 40 of the outer jacket 13. The lateral difference in rigidity in the lateral direction W is adjusted mainly by changing a specification (e.g., changing a width) of the elongated hole 50 of the inner jacket 14. As a result, both adjusting the holding power as desired and adjusting rigidity in the lateral direction W, e.g., the lateral difference in rigidity, as desired can be easily achieved. If the elongated hole 50 is disposed on the straight line that extends in the vertical direction E through the central axis C2, the function of adjusting the lateral difference in rigidity in the lateral direction W cannot be achieved. For this reason, the elongated hole 50 is disposed so as not to be on the straight line that extends in the vertical direction E through the central axis C2.

The plastic pin 52 fixed to the outer jacket 13 is inserted in the elongated hole 50 of the inner jacket 14 to restrict relative positions between the outer jacket 13 and the inner jacket 14. If the elongated hole 50 is disposed on a straight line that extends in the lateral direction W through the central axis C2, interference between the plastic pin 52 fixed to the outer jacket 13 and, for example, the first side plate 122 of the fixed bracket 19 (support member) can occur. However, according to the first embodiment, such an interference will not occur because the elongated hole 50 is disposed diagonally upward from the central axis C2.

The impact absorbing load can be obtained because, in case of secondary collision, the plastic pin 52 is broken by the end portion on the upper side XU in the axial direction X of the elongated hole 50. The thickness t2 of the second side plate 22 disposed on a second side opposite from the first side, in the lateral direction W, of the vertical plane VP is smaller than the thickness t1 of the first side plate 122 disposed on the first side to make a portion of the outer jacket 13 close to the second side plate 22 susceptible to deformation. Accordingly, the holding power for holding the inner jacket 14 can be increased, which leads to enhancement of vibration rigidity. The elongated hole 50 is provided in a portion of the inner jacket 14 close to the first side plate 122, which is the thicker one of the side plates, with respect to the vertical plane VP. Accordingly, the lateral difference in rigidity in the lateral direction W that results from a difference in thickness between the pair of side plates 122 and 22 can be reduced.

Figure 6:
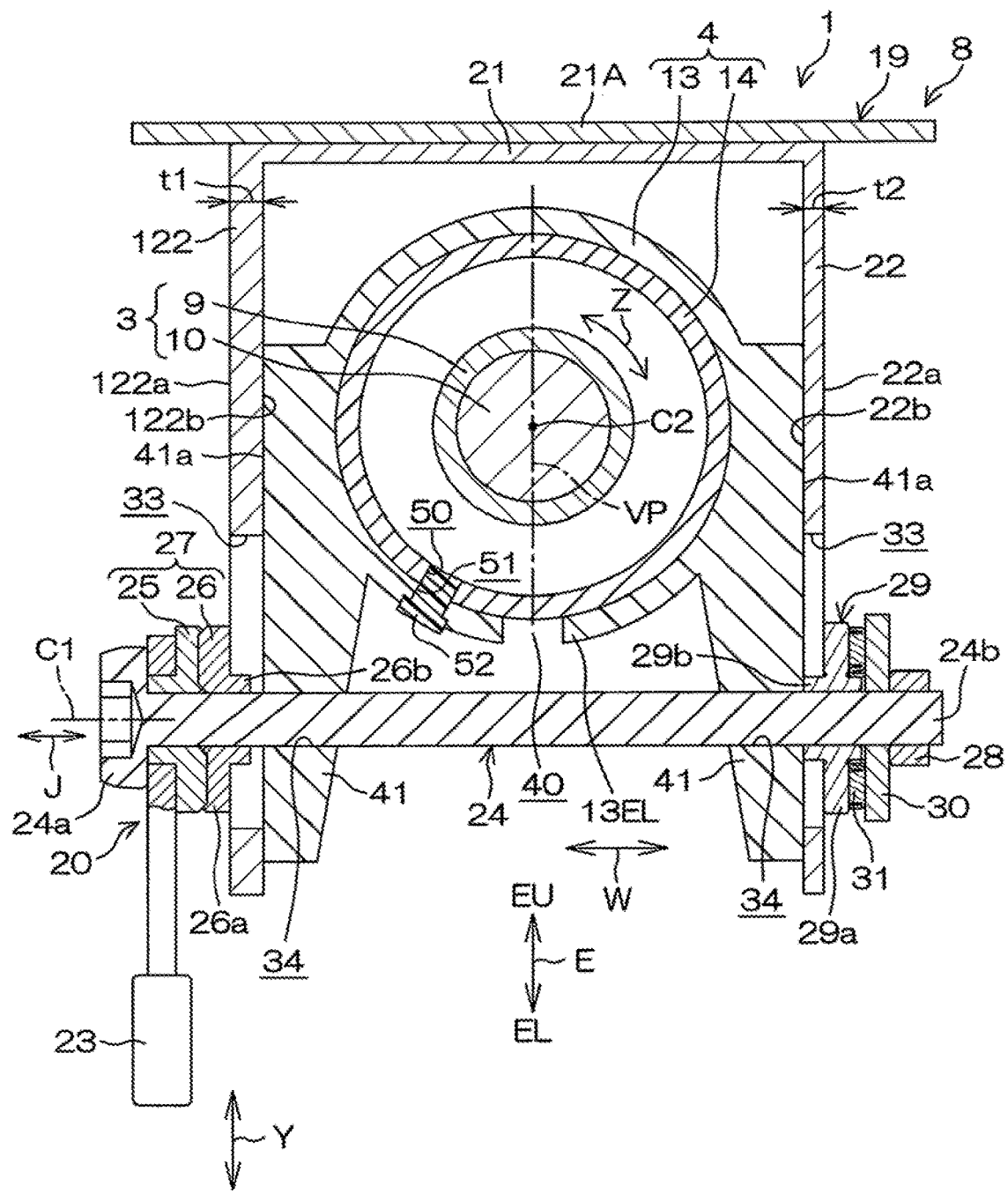
FIG. 6 is a schematic cross-sectional view illustrating the steering system according to a second embodiment.

In other words, when a configuration in which the thickness t2 of the second side plate 22 disposed on the second side, in the lateral direction W, of the vertical plane VP is smaller than the thickness t1 of the first side plate 122 disposed on the first side, in the lateral direction W, of the vertical plane VP, is employed to increase the holding power for holding the inner jacket 14 to enhance vibration rigidity, a lateral difference in rigidity in the lateral direction W is disadvantageously developed by an imbalance in rigidity between the first side and the second side. However, the lateral difference in rigidity in the lateral direction W can be reduced by offsetting the elongated hole 50 from the vertical plane VP to the first side (the side where the first side plate 122, which is the thicker one of the side plates, is disposed) in the lateral direction W. This leads to provision of the steering system 1 in which the lateral difference in rigidity in the lateral direction W is reduced and vibration rigidity is enhanced. FIG. 6 is a schematic cross-sectional view illustrating the steering system 1 according to a second embodiment. According to the second embodiment illustrated in FIG. 6, the elongated hole 50 is disposed in a portion of the inner jacket 14 close to the first side plate 122 (the thicker one of the side plates) with respect to the vertical plane VP, diagonally downward from the central axis C2.

Figure 7:
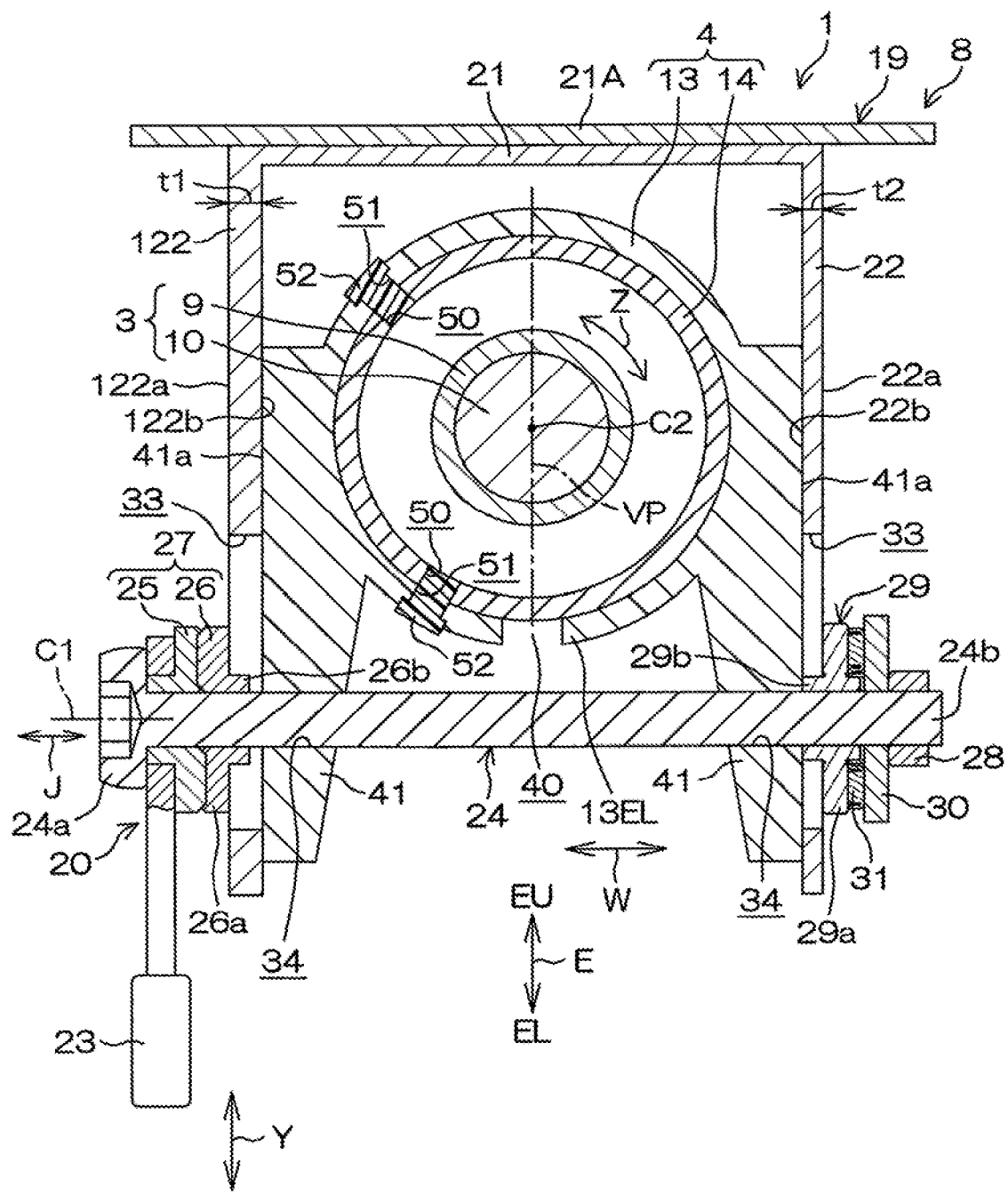
FIG. 7 is a schematic cross-sectional view illustrating the steering system according to a third embodiment.

FIG. 7 is a schematic cross-sectional view illustrating the steering system 1 according to a third embodiment. According to the third embodiment illustrated in FIG. 7, the elongated holes 50 are disposed in portions of the inner jacket 14 close to the first side plate 122 (the thicker one of the side plates) with respect to the vertical plane VP, at each of a position diagonally upward from the central axis C2 and a position diagonally downward from the central axis C2. The plastic pin 52 may be inserted in each of the elongated holes 50 as illustrated in FIG. 7. Alternatively, although not illustrated, the plastic pin 52 may be inserted in only one of the elongated holes 50. The impact absorbing load is adjustable with the number of the plastic pins 52.

Figure 8:
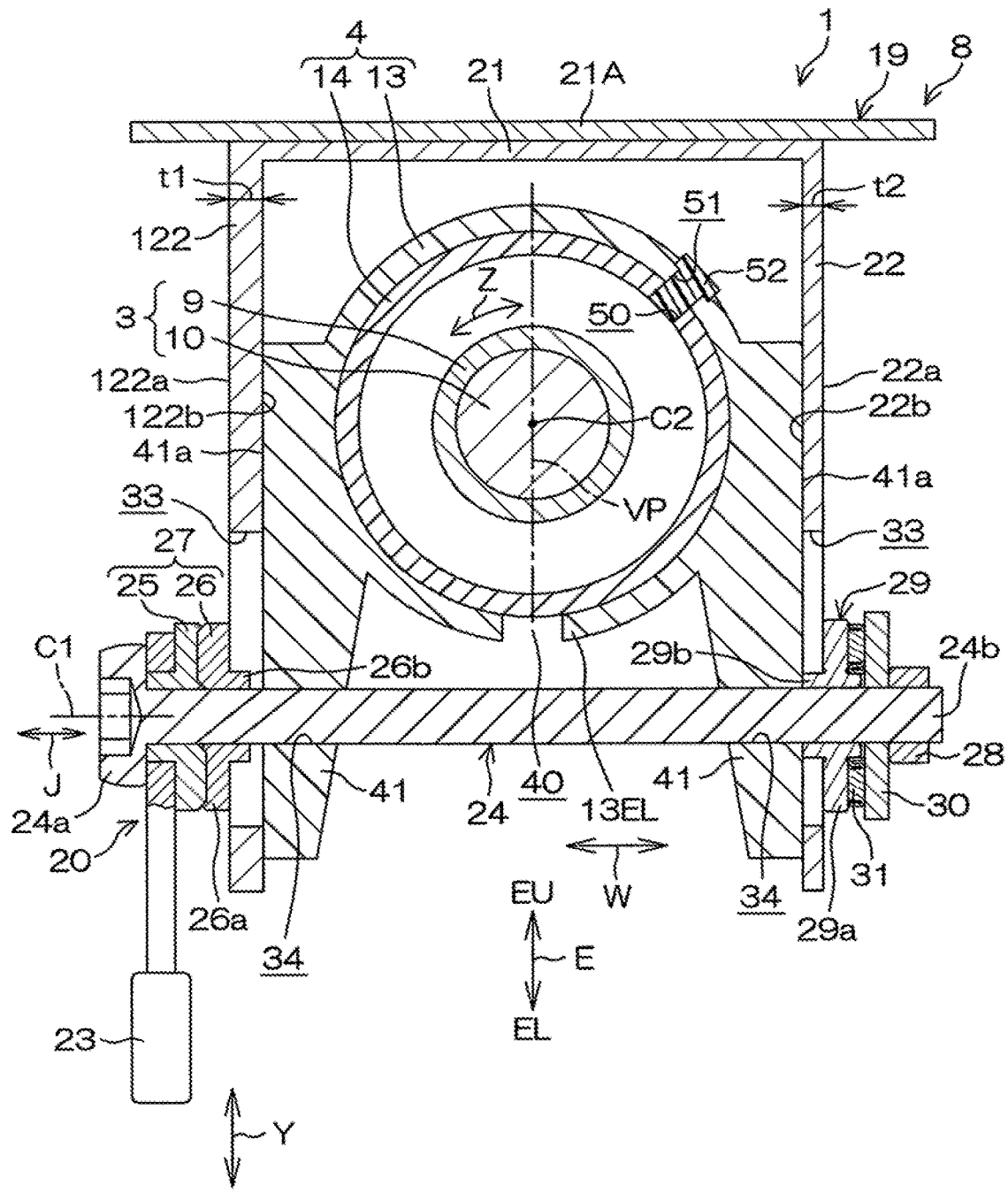
FIG. 8 is a schematic cross-sectional view illustrating the steering system according to a fourth embodiment.

Each of the second embodiment and the third embodiment can provide the same advantages as advantages provided by the first embodiment. FIG. 8 is a schematic cross-sectional view illustrating the steering system 1 according to a fourth embodiment. According to the fourth embodiment illustrated in FIG. 8, the elongated hole 50 is disposed in a portion of the inner jacket 14 close to the second side plate 22 (the thinner one of the side plates) with respect to the vertical plane VP, diagonally upward from the central axis C2.

Figure 9:
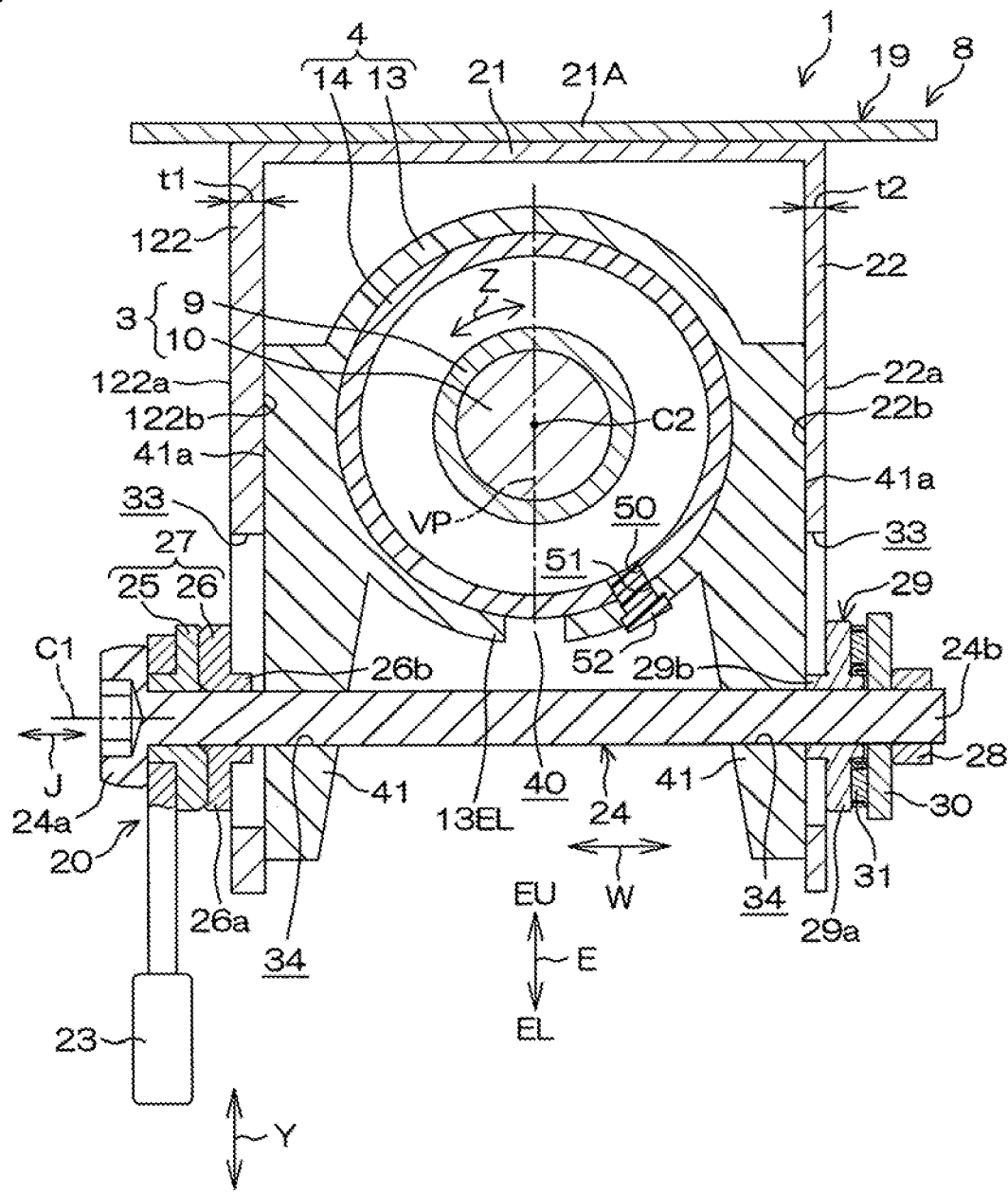
FIG. 9 is a schematic cross-sectional view illustrating the steering system according to a fifth embodiment.
Figure 10:
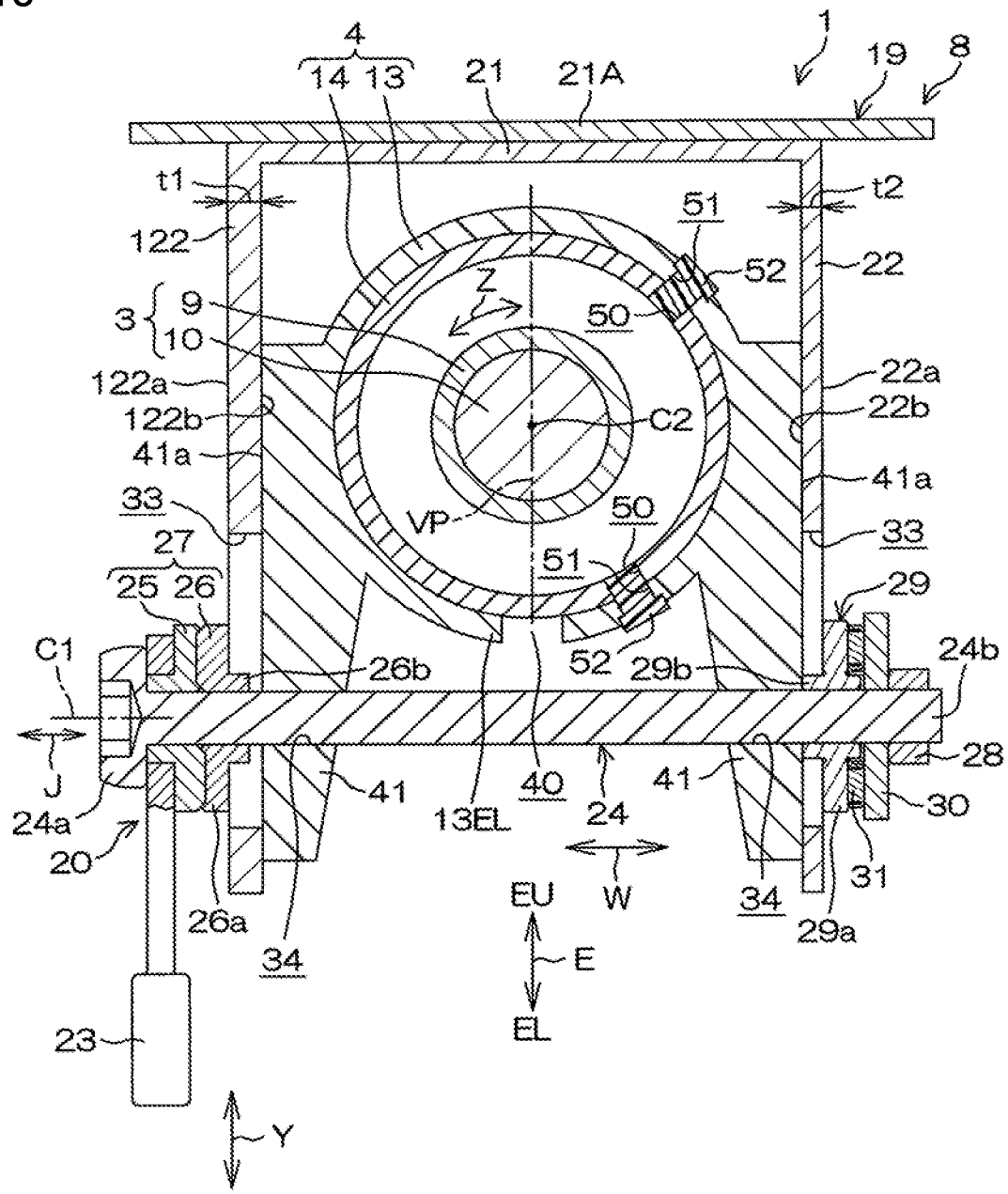
FIG. 10 is a schematic cross-sectional view illustrating the steering system according to a sixth embodiment.

FIG. 9 is a schematic cross-sectional view illustrating the steering system 1 according to a fifth embodiment. According to the fifth embodiment illustrated in FIG. 9, the elongated hole 50 is disposed in a portion of the inner jacket 14 close to the second side plate 22 (the thinner one of the side plates) with respect to the vertical plane VP, diagonally downward from the central axis C2. FIG. 10 is a schematic cross-sectional view illustrating the steering system 1 according to a sixth embodiment. According to the sixth embodiment illustrated in FIG. 10, the elongated holes 50 are disposed in portions of the inner jacket 14 close to the second side plate 22 (the thinner one of the side plates) with respect to the vertical plane VP, at each of a position diagonally upward from the central axis C2 and a position diagonally downward from the central axis C2. The plastic pin 52 may be inserted in each of the elongated holes 50 as illustrated in FIG. 10. Alternatively, although not illustrated, the plastic pin 52 may be inserted in only one of the elongated holes 50. The impact absorbing load is adjustable with the number of the plastic pins 52.

According to each of the fourth to sixth embodiments, the second side plate 22 on the second side, in the lateral direction W, of the vertical plane VP is thinner than the first side plate 122 on the first side to increase the holding power for holding the inner jacket 14 so that vibration rigidity is enhanced. A request to increase lateral imbalance (increase the lateral difference) in rigidity in the lateral direction W can be met by providing the elongated hole 50 in a portion of the inner jacket 14 close to the second side plate 22, which is the thinner one of the side plates, with respect to the vertical plane VP passing through the central axis C2.

The invention is not limited to the embodiments described above. For example, the plastic pin(s) 52 inserted in the elongated hole(s) 50 may be omitted from each of the embodiments. Each of the embodiments employs the configuration, in which the pair of side plates 122 and 22 differs from each other in thickness. Alternatively, a configuration (not illustrated) may be employed, in which a thickness in the lateral direction W of one of the clamped portions 41 disposed on the first side, in the lateral direction W, of the vertical plane VP differs from a thickness in the lateral direction W of the other one of the clamped portions 41 disposed on the second side, in the lateral direction W, of the vertical plane VP. A configuration may alternatively be employed, in which a first side plate disposed on the first side, in the lateral direction W, of the vertical plane VP has a thickness larger than a thickness of a second side plate disposed on the second side, and one of the clamped portions 41 disposed on the first side, in the lateral direction W, of the vertical plane VP has a thickness larger than a thickness of the other one of the clamped portions 41 disposed on the second side, in the lateral direction W, of the vertical plane VP.

Various other modifications may be made to the invention within the scope of the appended claims.

What is claimed is:

1. A steering system comprising:
a column jacket including a hollow outer jacket having a slit and a pair of clamped portions disposed to sandwich the slit between the clamped portions, and a tubular inner jacket fitted in the outer jacket to be slidable in an axial direction relative to the outer jacket, an elongated hole being formed in a wall of the inner jacket at a position where the inner jacket is fitted in the outer jacket, the elongated hole being a through hole or a blind hole that is elongated in the axial direction;

a support member fixed to a vehicle body and including a pair of a first side plate and a second side plate that sandwiches the pair of clamped portions of the outer jacket in a lateral direction; and a clamping mechanism that holds a position of the inner jacket relative to the outer jacket by clamping the outer jacket against the inner jacket with the pair of side plates, wherein the elongated hole is disposed on one of a first side and a second side, in the lateral direction, of a vertical plane passing through a central axis of the inner jacket, at a position other than on a straight line that extends in a vertical direction through the central axis.

2. The steering system according to claim 1, wherein at least one of a configuration in which the first side plate disposed on the first side, in the lateral direction, of the vertical plane has a lateral thickness larger than a lateral thickness of the second side plate disposed on the second side, in the lateral direction, of the vertical plane and a configuration in which one of the clamped portions disposed on the first side, in the lateral direction, of the vertical plane has a lateral thickness larger than a lateral thickness of the other one of the clamped portions disposed on the second side, in the lateral direction, of the vertical plane is achieved, and the elongated hole is disposed on the first side, in the lateral direction, of the vertical plane.

3. The steering system according to claim 1, wherein at least one of a configuration in which the first side plate disposed on the first side, in the lateral direction, of the vertical plane has a lateral thickness larger than a lateral thickness of the second side plate disposed on the second side, in the lateral direction, of the vertical plane and a configuration in which one of the clamped portions disposed on the first side, in the lateral direction, of the vertical plane has a lateral thickness larger than a lateral thickness of the other one of the clamped portions disposed on the second side, in the lateral direction, of the vertical plane is achieved, and the elongated hole is disposed on the second side, in the lateral direction, of the vertical plane.

4. The steering system according to claim 1, wherein the elongated hole and the slit are disposed at a same position along the axial direction.

5. The steering system according to claim 1, further comprising a pin that is fixed to the outer jacket and is configured to be inserted in the elongated hole to restrict relative positions between the outer jacket and the inner jacket.

6. The steering system according to claim 1, further comprising a pin fixed to the outer jacket and inserted in the elongated hole to restrict relative positions between the outer jacket and the inner jacket, wherein when the inner jacket is viewed in the axial direction, the elongated hole is disposed at at least one of a position diagonally upward from the central axis and a position diagonally downward from the central axis.

7. The steering system according to claim 6, wherein the pin is a plastic pin that is to be broken by an end portion of the elongated hole in case of secondary collision.

* * * * *